United States Patent
Demeter (12)

(10) Patent No.: US 11,577,202 B2
(45) Date of Patent: Feb. 14, 2023

(54) ELECTRODIALYSIS PROCESS AND BIPOLAR MEMBRANE ELECTRODIALYSIS DEVICES FOR SILICA REMOVAL

(71) Applicant: Magna Imperio Systems Corp., Houston, TX (US)

(72) Inventor: Ethan Demeter, The Woodlands, TX (US)

(73) Assignee: Magna Imperio Systems Corp., Houston, TX (US)

( * ) Notice: Subject to any disclaimer, the term of this patent is extended or adjusted under 35 U.S.C. 154(b) by 349 days.

(21) Appl. No.: 16/911,056

(22) Filed: Jun. 24, 2020

(65) Prior Publication Data

US 2020/0406194 A1    Dec. 31, 2020

Related U.S. Application Data (60) Provisional application No. 62/866,407, filed on Jun. 25, 2019.

(51) Int. Cl.
*B01D 61/44* (2006.01)
*C02F 1/469* (2006.01)
(Continued)

(52) U.S. Cl.
CPC ........... *B01D 61/445* (2013.01); *B01D 61/50* (2013.01); *C02F 1/4693* (2013.01);
(Continued)

(58) Field of Classification Search
None
See application file for complete search history.

(56) References Cited

U.S. PATENT DOCUMENTS 3,878,086 A    4/1975 Haswell et al.
3,933,617 A    1/1976 Yamamoto et al.
(Continued)

FOREIGN PATENT DOCUMENTS

FR    2116845 A5    7/1972
GB    1268182 A    3/1972
(Continued)

OTHER PUBLICATIONS

International Search Report and Written Opinion dated Nov. 19, 2020, directed to International Application No. PCT/US20/39405; 18 pages.
(Continued)

*Primary Examiner* — Wojciech Haske
(74) *Attorney, Agent, or Firm* — Morrison & Foerster LLP (57) ABSTRACT

Provided are electrodialysis systems for removing silica from a desalinated water stream and methods for removing silica from a desalinated water stream. For example, described are bipolar membrane electrodialysis devices for removing silica from water comprising one or more anion exchange membranes; one or more bipolar membranes; and a pair of electrodes comprising a positive electrode and a negative electrode. Also described are electrodialysis systems comprising: one or more electrodialysis devices for the removal of dissolved ions and one or more bipolar membrane electrodialysis devices, wherein a product inlet stream of the one or more bipolar membrane electrodialysis devices comprises the product outlet stream of the one or more electrodialysis devices.

14 Claims, 3 Drawing Sheets

(51) Int. Cl.
- *B01D 61/50* (2006.01)
- *C02F 103/08* (2006.01)
- *C02F 101/10* (2006.01)
- *C02F 1/461* (2023.01)

(52) U.S. Cl.
CPC .............. *C02F 2001/46128* (2013.01); *C02F 2101/10* (2013.01); *C02F 2103/08* (2013.01); *C02F 2201/4611* (2013.01); *C02F 2201/46115* (2013.01); *C02F 2209/06* (2013.01); *C02F 2303/22* (2013.01)

(56) References Cited

U.S. PATENT DOCUMENTS

| | | |
|---|---|---|
| 4,183,749 A | 1/1980 | Yabe et al. |
| 4,253,928 A | 3/1981 | Blytas et al. |
| 4,303,493 A | 12/1981 | Kneifel et al. |
| 4,319,978 A | 3/1982 | Millman |
| 4,569,747 A | 2/1986 | Kedem et al. |
| 5,187,025 A | 2/1993 | Kelland et al. |
| 5,681,438 A | 10/1997 | Proulx |
| 6,090,258 A | 7/2000 | Mirsky et al. |
| 6,156,180 A | 12/2000 | Tessier et al. |
| 6,235,166 B1 | 5/2001 | Towe et al. |
| 8,313,651 B2 | 11/2012 | Childs et al. |
| 8,652,705 B2 | 2/2014 | Berta et al. |
| 9,169,138 B2 | 10/2015 | Sparrow et al. |
| 9,422,176 B2 | 8/2016 | Ng et al. |
| 2002/0163101 A1 | 11/2002 | Cotton et al. |
| 2005/0150768 A1 | 7/2005 | Sferrazza |
| 2006/0275859 A1 | 12/2006 | Kjaer |
| 2007/0215474 A1 | 9/2007 | Batchelder et al. |
| 2010/0326833 A1 | 12/2010 | Messalem et al. |
| 2013/0126353 A1 | 5/2013 | Perez et al. |
| 2014/0251896 A1 | 9/2014 | Hirozawa et al. |
| 2017/0036171 A1 | 2/2017 | Lienhard et al. |
| 2018/0353909 A1 | 12/2018 | Van Der Burg et al. |
| 2020/0155967 A1 | 5/2020 | Mcdonald et al. |
| 2020/0324249 A1 | 10/2020 | Li et al. |
| 2022/0212124 A1 | 7/2022 | McDonald et al. |
| 2022/0219098 A1 | 7/2022 | McDonald et al. |

FOREIGN PATENT DOCUMENTS

| | | |
|---|---|---|
| WO | 97/28889 A1 | 8/1997 |
| WO | 02/26365 A1 | 4/2002 |
| WO | 03/020645 A2 | 3/2003 |
| WO | 2017/089747 A1 | 6/2017 |

OTHER PUBLICATIONS

Reig et al. (Nov. 2016). "Integration of monopolar and bipolar electrodialysis for valorization of seawater reverse osmosis desalination brines: Production of strong acid and base," Desalination 398: 29 pages.

Li et al., U.S. Office Action dated Jun. 15, 2022, directed to U.S. Appl. No. 16/844,787; 8 pages.

McDonald et al., Office Action dated Sep. 3, 2021, directed to U.S. Appl. No. 16/685,617; 10 pages.

International Preliminary Report on Patentability dated May 18, 2021, directed to International Application No. PCT/B2019/001306; 8 pages.

McDonald et al., Office Action dated May 19, 2021, directed to U.S. Appl. No. 16/685,617; 11 pages.

Extended European Search Report dated Jul. 7, 2022, directed to EP Application No. 19896649.1; 15 pages.

International Search Report and Written Opinion dated Jul. 17, 2020, directed to International Application No. PCT/US20/27517; 15 pages.

International Search Report and Written Opinion dated Sep. 28, 2020, directed to International Application No. PCT/IB19/01306; 22 pages.

Invitation to Pay Additional Fees dated Jul. 27, 2020, directed to International Application No. PCT/IB19/01306; 3 pages.

Invitation to Pay Additional Fees dated Sep. 15, 2020, directed to International Application No. PCT/US20/39405; 3 pages.

ELECTRODIALYSIS PROCESS AND BIPOLAR MEMBRANE ELECTRODIALYSIS DEVICES FOR SILICA REMOVAL

CROSS-REFERENCE TO RELATED APPLICATIONS

This application claims the priority of U.S. Provisional Application No. 62/866,407, filed Jun. 25, 2019, the entire contents of which are incorporated herein by reference.

FIELD OF THE DISCLOSURE

This disclosure relates to electrodialysis systems for removing silica from water. Specifically, this disclosure relates to electrodialysis systems comprising at least one electrodialysis device for removing dissolved ions and at least one bipolar membrane electrodialysis device for removing silica from water.

BACKGROUND OF THE DISCLOSURE

Thermal processes, such as distillation, were the primary methods for desalinating brackish and brine water sources up until the mid-$20^{th}$ century. These methods are energy intensive due to the requirement that the water undergo a phase change to vapor to separate the unwanted constituents, which do not undergo the phase change. The energy required for this transformation is far greater than what would be required to separate the constituents if the water were to remain in the liquid phase.

Electrochemical methods were developed to reduce the energy requirements of the desalination process, by avoiding energy intensive phase changes. Electrochemical methods typically employ two electrodes with ion exchange membranes placed in between. The ion exchange membranes preferentially allow the passage of positively or negatively charged ions depending on the nature of the functional groups attached to their pores. Alternating these membrane types creates compartments that allow the removal of ions from one stream and the addition of ions to an adjacent stream when an electric field is applied between the electrodes that encapsulate the membranes.

The electrochemical desalination method provides an energy efficient desalination process. To increase the process capacity of this method, pairs of ion exchange membranes are stacked on top of each other to form stacks. These stacks can range from 1 pair to over 1000 pairs.

In many ion separation technologies, ions are removed from one stream and concentrated in another. The concentrated brine stream produced is a waste stream that must be disposed. There is currently particular interest in the development of new processes and technologies to reduce the amount of waste generated, thus reducing the cost of disposal. These so-called high-recovery applications introduce new challenges that must be overcome to maximize the amount of clean water that can be recovered from the process. For an electrodialysis device to operate successfully, the rate of ions transferred across the membrane must be faster than the flux of water across the ion exchange membranes due to osmosis and electroosmosis. This becomes increasingly difficult as the recovery increases.

$$C_{Brine} = \frac{C_{Inlet} - Recovery * C_{Product}}{1 - Recovery}$$

Based on the relationship in Equation 1, it is apparent that the brine concentration increases with increasing recovery. Additionally, the concentration of individual dissolved species increases with increasing recovery. This becomes particularly problematic when those constitutive species are sparingly soluble salts or scale forming species such as silica (i.e., $SiO_2$).

Technologies such as reverse osmosis can remove silica from water, but there is a limit to the concentration of silica that can be sent to a reverse osmosis unit without scale building up on the surface of the membranes. Due to the high rate of rejection in reverse osmosis units (>99%), the recovery is limited by the silica concentration in the reject, or brine stream. Another commonly used technology for the removal of silica is the use of strong base ion exchange resin columns. These devices work by absorbing silica molecules onto the surface of ion exchange resin particles, where they remain. This process can be undesired because it requires frequent backwashing and regeneration of the resin bed using harsh chemicals in order to continue to remove silica. The removal efficiency is also reduced by the presence of other dissolved ions that compete with silica for resin sites and increase the frequency with which the resin bed must be regenerated.

Electrodialysis technologies may also be used to remove silica (i.e., silicon dioxide) from water. For example, silica may be removed from water by adjusting the pH of the water to a value greater than 10 before passing the water through a traditional electrodialysis unit.

BRIEF SUMMARY OF DISCLOSURE

Provided are bipolar membrane electrodialysis devices for removing silica from water. Also provided are electrodialysis systems that remove dissolved ions and dissolved silica from water streams. In particular, electrodialysis systems described herein can have one or more electrodialysis devices for removing dissolved ions and one or more bipolar membrane electrodialysis devices for removing dissolved silica from a water stream. For example, a water stream can be treated by the one or more electrodialysis devices to remove any dissolved ions from the water stream and subsequently treated by the one or more bipolar membrane electrodialysis devices to remove any dissolved silica from the desalinated water stream.

Bipolar membrane electrodialysis devices described herein for removing dissolved silica can be designed to (1) increase the pH within the treated water stream (i.e., product stream) to promote the ionization of dissolved silica; (2) shuttle silicate anions from the treated water stream to the brine stream; and (3) reduce the pH of the brine stream to decrease the likelihood of scale formation in the brine stream.

Electrodialysis devices (i.e., traditional electrodialysis devices) described can be designed to remove dissolved ions from a product stream and deliver a low conductivity product stream to a bipolar membrane electrodialysis device. The conductivity of the desalinated product stream may be less than 100 µS/cm, less than 50 µS/cm, or less than 25 µS/cm. The conductivity of the desalinated product stream may be more than 5 µS/cm, more than 25 µS/cm, or more than 50 µS/cm. In some embodiments, the conductivity of the desalinated product stream is 5-100 µS/cm, 5-50 µS/cm, or 5-25 µS/cm. The ability to remove dissolved ionic species to such a desired level, without also removing uncharged species such as silica to a similar degree can be unique to electrochemical techniques such as electrodialysis.

In some embodiments, the two systems (i.e., traditional electrodialysis and bipolar membrane electrodialysis), share a brine tank, with the overall system recovery dictated by the amount/rate of the brine that is expelled from the system. Typically, electrodialysis processes produce a product that has been de-ionized to a conductivity of around 1,000 µS/cm and not typically lower than 500 µS/cm. Through process and system modifications described elsewhere (e.g., U.S. Provisional Application No. 62/831,508 titled "Electrodialysis Systems with Decreased Concentration Gradients at High Recovery Rates" and U.S. Provisional Application No. 62/768,644 titled "Spacers for Ion-Exchange Device", both of which are incorporated herein in their entirety), a much lower conductivity product water than is typically produced via electrodialysis can be achieved. By starting with a lower conductivity (i.e., lower ionic concentration), less hydroxide can be required to reduce the pH, and the likelihood of transferring a silicate ion is higher, both of which are unique benefits to the process described herein. Additionally, by using a bipolar membrane electrodialysis device to remove the silica, the pH in the treated water can be maintained at a value high enough to ionize silica.

In some embodiments, an electrodialysis system comprises one or more electrodialysis devices, the one or more electrodialysis devices comprising a product inlet stream, a product outlet stream, a brine inlet stream, and a brine outlet stream; and one or more bipolar membrane electrodialysis devices, the one or more bipolar electrodialysis devices comprising a product inlet stream, a product outlet stream, a brine inlet stream, and a brine outlet stream, wherein the product inlet stream of a first bipolar membrane electrodialysis device of the one or more bipolar membrane electrodialysis devices comprises the product outlet stream of a first electrodialysis device of the one or more electrodialysis devices. In some embodiments, each bipolar membrane electrodialysis device of the one or more bipolar electrodialysis devices comprises one or more anion exchange membranes and one or more bipolar membranes. In some embodiments, each bipolar membrane of the one or more bipolar membranes comprises an anionic material and a cationic material. In some embodiments, the one or more anion exchange membranes and the one or more bipolar membranes form an alternating stack within each bipolar membrane electrodialysis device of the one or more bipolar membrane electrodialysis devices. In some embodiments, the one or more electrodialysis devices are configured to remove dissolved ions from a feed stream to form a desalinated product stream. In some embodiments, the one or more bipolar membrane electrodialysis devices are configured to remove silica from a desalinated product stream. In some embodiments, the product inlet stream for a second electrodialysis device comprises a brine outlet stream of the first electrodialysis device of the one or more electrodialysis devices. In some embodiments, the brine inlet stream for the first bipolar electrodialysis device comprises the brine outlet stream of the second electrodialysis device. In some embodiments, the system comprises a feed stream, wherein the brine inlet stream of the first electrodialysis device comprises the feed stream. In some embodiments, the system comprises a feed stream, wherein the product inlet stream of a second electrodialysis device comprises the feed stream. In some embodiments, the product inlet stream of the first electrodialysis device comprises the product outlet stream of the second electrodialysis device. In some embodiments, the product inlet stream of the first bipolar membrane electrodialysis device comprises the product outlet stream of the first electrodialysis device. In some embodiments, the brine inlet stream of the first bipolar membrane electrodialysis device comprises the brine outlet stream of the first electrodialysis device. In some embodiments, the second electrodialysis device is located before the first electrodialysis device.

In some embodiments, a bipolar membrane electrodialysis device comprises one or more anion exchange membranes; one or more bipolar membranes; and a pair of electrodes comprising a positive electrode and a negative electrode. In some embodiments, each bipolar membrane of the one or more bipolar membranes comprises an anionic material and a cationic material. In some embodiments, wherein the one or more anion exchange membrane and the one or more bipolar membranes form an alternating stack sandwiched between the positive electrode and the negative electrode of the pair of electrodes. In some embodiments, the bipolar membrane electrodialysis device is configured to remove silica from a desalinated water stream. In some embodiments, the device comprises an acid chamber and an alkaline/base chamber. In some embodiments, a product inlet stream of the bipolar membrane electrodialysis device flows through the alkaline/base chamber. In some embodiments, a brine inlet stream of the bipolar membrane electrodialysis device flows through the acid chamber.

In some embodiments, a method of purifying water comprises passing water through one or more electrodialysis devices to remove dissolved ions and form a desalinated product stream, wherein each electrodialysis device of the one or more electrodialysis devices comprises a product inlet stream, a product outlet stream, a brine inlet stream, and a brine outlet stream; and routing the desalinated product stream to one or more bipolar membrane electrodialysis devices to remove silica, wherein each bipolar membrane electrodialysis device of the one or more bipolar membrane electrodialysis devices comprises a product inlet stream, a product outlet stream, a brine inlet stream, and a brine outlet stream. In some embodiments, each bipolar membrane electrodialysis device comprises one or more anion exchange membranes and one or more bipolar membranes. In some embodiments, each bipolar membrane of the one or more bipolar membranes comprises an anionic material and a cationic material. In some embodiments, the one or more anion exchange membrane and the one or more bipolar membranes form an alternating stack within each bipolar membrane electrodialysis device of the one or more bipolar membrane electrodialysis devices. In some embodiments, the method comprises routing a product inlet stream for a first electrodialysis device of the one or more electrodialysis devices, wherein the product inlet stream of the first electrodialysis device comprises a brine outlet stream of a second electrodialysis device of the one or more electrodialysis devices. In some embodiments, the method comprises routing a product inlet stream for a first bipolar membrane electrodialysis device of the one or more bipolar membrane electrodialysis devices, wherein the product inlet stream for the first bipolar membrane electrodialysis device comprises the product outlet stream of the second electrodialysis device. In some embodiments, the method comprises routing a brine inlet stream for the first bipolar electrodialysis device, wherein the brine inlet stream of the first bipolar membrane electrodialysis device comprises a brine outlet stream of the second electrodialysis device. In some embodiments, the method comprises routing a brine inlet stream for the first bipolar electrodialysis device, wherein the brine inlet stream of the first bipolar membrane electrodialysis device comprises a brine outlet stream of the first electrodialysis device. In some embodiments, the method comprises routing a feed stream, wherein the brine inlet stream of the first electrodialysis device comprises the feed stream. In some embodiments, the method comprises routing a feed stream, wherein the product inlet stream of the second electrodialysis device comprises the feed stream. In some embodiments, the method comprises routing a product inlet stream of the second electrodialysis device, wherein the product inlet stream of the second electrodialysis device comprises the product outlet stream of the first electrodialysis device.

BRIEF DESCRIPTION OF THE DRAWINGS

The invention will now be described, by way of example only, with reference to the accompanying drawings, in which.

DETAILED DESCRIPTION OF THE DISCLOSURE

Provided are systems and methods for removing dissolved ions and/or silica from water. For example, electrodialysis systems described may comprise at least one electrodialysis device for removing dissolved ions from a water stream to produce a desalinated water stream and at least one bipolar membrane electrodialysis device for removing silica from the desalinated water stream. In particular, electrodialysis systems disclosed herein are continuous electrodialytic water treatment processes that can both desalinate and remove silica from water.

Dissolved silica in water can be problematic for several reasons. For example, dissolved silica in water can create scale buildup. However, by first removing dissolved ions and then treating the water to remove dissolved silica, the disclosed systems can enable a much higher water recovery to be achieved by removing the problematic scale-forming silica from the water.

Although conventional processes for removing silica described above (i.e., adjusting the pH of the water to 10 or greater and passing it through an electrodialysis device), do in fact produce some silica removal, the pH of the treated stream tends to rapidly decrease towards neutral values during the electrodialysis process. When the pH of the stream decreases, so too does the amount of silica that exists in an ionized form. Without being an ion, there can be no removal of silica in the electrodialysis device.

However, electrodialysis systems described herein can remove silica from water more efficiently. In addition to removing silica, electrodialysis devices and processes described herein can also remove dissolved ions. Thus, treating water using the devices and methods provided can remove both dissolved ions and dissolved silica from the same feed water stream.

Electrodialysis systems provided herein can include at least two stages (e.g., a first electrodialysis stage, and a second bipolar membrane dialysis stage). In some embodiments, the first stage may include traditional electrodialysis to selectively remove dissolved ions from water to produce a desalinated product stream. Because silica exists as an un-charged associated species under neutral pH conditions, it passes through this electrodialysis stage without issue. By first removing dissolved ions from the water using traditional electrodialysis, the likelihood that any dissolved silica will be removed in stage two of the electrodialysis system can be increased.

Once the water stream has been sufficiently removed of ions in the first stage of an electrodialysis system, the desalinated water is passed to a second stage of an electrodialysis system. In some embodiments, the second stage includes electrodialysis devices having bipolar membranes (i.e., bipolar membrane electrodialysis devices). These bipolar membranes can include an anion exchange membrane ("anion exchange material" or "anion material") connected to a cation exchange membrane ("cationic exchange material" or "cationic material"). Placing a bipolar ion exchange membrane into an electrodialysis unit can lead to the electrolysis of water at the interface between the layers of the bipolar membrane. The liberated hydroxide ($OH^-$) ions can pass through the anion exchange material of the bipolar membrane and increase the pH of the stream in contact with this material. Utilizing this mechanism to increase the pH to a value greater than 10 promotes the ionization of silica to a monovalent anion species. This anion species can then be transferred through the adjacent anion exchange membrane, leaving a stream devoid of ions and silica.

On the opposite side of the bipolar membrane, $H^+$ ions are released into the brine stream. These released $H^+$ ions allow for the generation of acid in the brine stream, which reduces the pH of the brine and in turn, reduces the formation of other scaling species such as calcium carbonate.

Bipolar membrane electrodialysis devices described herein include an alkaline (base) chamber and an acid chamber. A decrease in the pH of the treated product stream is avoided by placing it in the alkaline (base) chamber of the bipolar membrane electrodialysis device. Thus, for every electron passed through the system, one hydroxide ion is produced at the bipolar membrane, and either a silica ion is transferred (desired effect) and the pH is increased, or a hydroxide ion is transferred and the pH remains the same. The brine stream enters the acid chamber of the bipolar membrane electrodialysis device.

Figure 1:
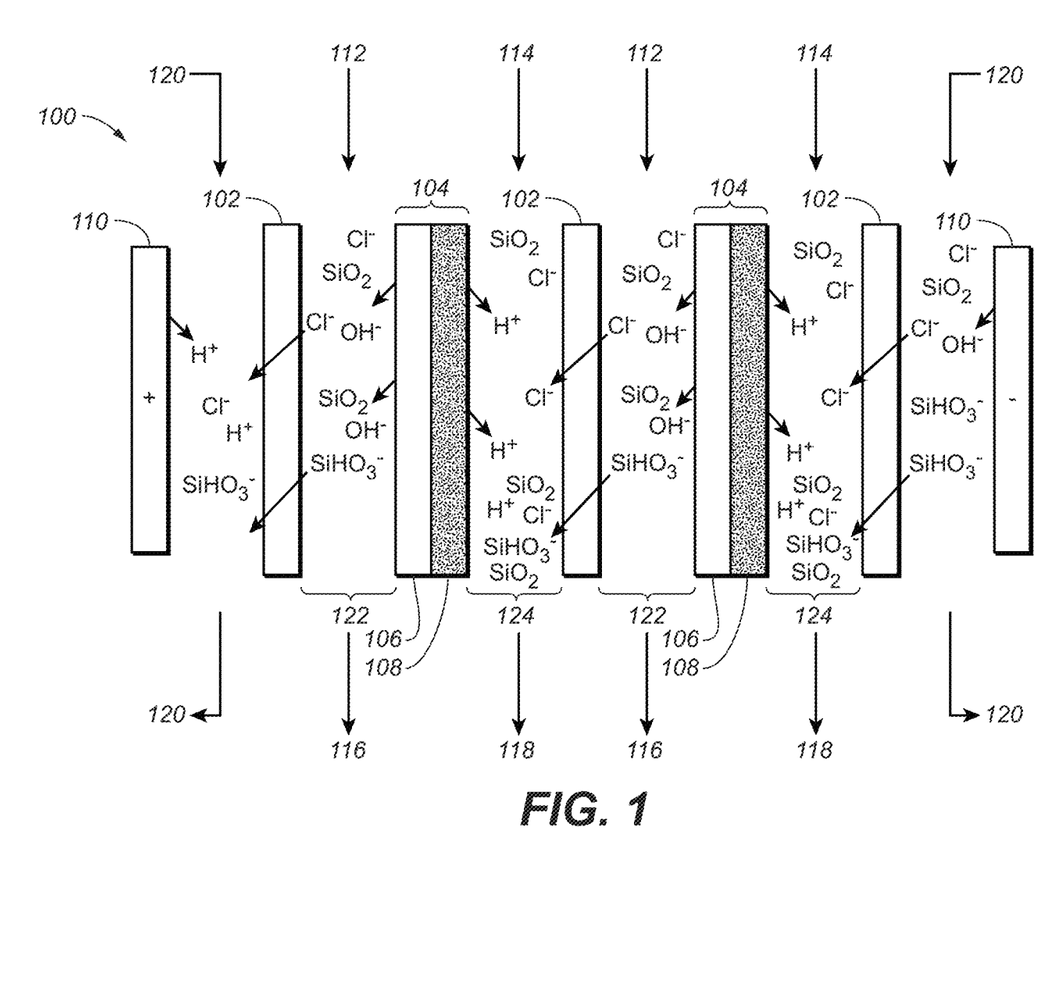
FIG. 1 shows a schematic representation of a bipolar membrane electrodialysis device for the ionization and removal of silica from a water stream, according to some embodiments.

FIG. 1 shows an example of a bipolar membrane electrodialysis device (i.e., electro-desilicizer) 100 according to some embodiments. FIG. 1 also demonstrates how individual species (e.g., $Cl^-$, $SiO_2$, $OH^-$, $SiHO_3^-$) are impacted by the electric field in a bipolar membrane electrodialysis device. As described above, electrodialysis systems may include at least two stages of water treatment. After being treated by traditional electrodialysis to produce a desalinated product stream in a first stage of an electrodialysis system provided herein, the desalinated product stream may pass through a second stage of treatment comprising bipolar membrane electrodialysis device 100.

In some embodiments, bipolar membrane electrodialysis device 100 can include anion exchange membrane 102, bipolar membrane 104, electrode 110, product inlet stream 112, brine inlet stream 114, product outlet stream 116, brine outlet stream 118, and electrolyte stream 120.

Bipolar membrane electrodialysis device 100 may include a plurality of anion exchange membranes 102. For example, as shown in FIG. 1, three anion exchange membranes 102 are shown alternating with two bipolar membranes 104. However, any number of anion exchange membranes 102 may be used between 1 and 10.

Bipolar membrane electrodialysis device 100 also includes at least one bipolar membrane 104. Bipolar membrane 104 can include anode material 106 and cathode material 108. In some embodiments, anode material 106 of bipolar membrane 104 may be the same material as anion exchange membrane 102. In some embodiments, anode material 106 of bipolar membrane 104 may be different material from anion exchange membrane 102. Any number of bipolar membranes between 1 and 10 may be included in bipolar membrane electrodialysis device 100. In some embodiments, cathode material 108 can be a cation exchange membrane.

Due to the polarization (+ and −) of the electric field created by a positive electrode 110 and a negative electrode 110, dissolved ions migrate towards the membrane material of opposite charge. Thus, anions migrate towards the positive electrode (anode) 110 and cations migrate towards the negative electrode (cathode) 110. When an electron moves to the positive electrode 110 via the external circuit, one ion can be transferred across an ion exchange membrane in order to maintain charge neutrality within the system. For example, in the system shown in FIG. 1, this means that an anion is transferred across an anion exchange membrane 102. However, at bipolar membrane 104, ions are blocked from transferring across the membrane. Instead, water ($H_2O$) is disassociated into $H^+$ and $OH^-$ ions. Thus, in the brine channels or acid chambers 124 (i.e., spaces between cathode material 108 of bipolar membrane 104 and anion exchange membrane 102, where brine inlet stream 114 enters bipolar membrane electrodialysis device 100 and brine outlet stream 118 exits bipolar membrane electrodialysis device 100), electroneutrality is achieved by hydronium ions balancing the anions that are transferred across the anion exchange membrane 102. This in turn can increase the concentration and lowers the pH of the brine streams in the brine channel.

In the process channels or alkaline/base chambers 122 (i.e., spaces between anode material 106 and anion exchange membrane 102, where process inlet stream 112 enters bipolar membrane electrodialysis device 100 and process outlet stream 116 exits bipolar membrane electrodialysis device 100), hydroxide ions are transferred via bipolar membrane 104, and an anion (e.g., $Cl^-$, $SiOH_3^-$) is transferred across anion exchange membrane 102 to satisfy electroneutrality. Adding hydroxide to this stream increases the pH of the process streams in the process channel, increasing the likelihood that silica will ionize. Once silica has been ionized, the influence of the electric field can drive it toward the adjacent anion exchange membrane 102, where it may eventually transfer across anion exchange membrane 102, into the adjacent brine streams/brine channel, and out of bipolar electrodialysis device 100 in brine outlet stream 118.

The inlet streams for bipolar membrane electrodialysis device 100 include product inlet stream 112 and brine inlet stream 114. Product inlet stream 112 may be the desalinated product water obtained from stage one of an electrodialysis system (e.g., traditional electrodialysis). Brine inlet stream 114 may be the waste stream obtained from stage one of an electrodialysis system (e.g., traditional electrodialysis). In some embodiments, product inlet stream 112 may have a lower ionic concentration than brine inlet stream 114.

The outlet streams for bipolar membrane electrodialysis device 100 include product outlet stream 116 and brine outlet stream 118. Product outlet stream 116 may be an outlet stream for a complete electrodialysis system (i.e., having both a first stage for removing dissolved ions and a second stage for removing silica). Thus, product outlet stream 116 may comprise water that has been treated to remove both dissolved ions and silica. Brine outlet stream 118 may be a waste stream. In some embodiments, brine outlet stream may recirculate through a brine recirculation loop of an electrodialysis system.

As described above, a pair of electrodes (including a positive electrode 110 and a negative electrode 110) may be positioned in bipolar membrane electrodialysis device 100 such that they sandwich a stack comprising one or more anion exchange membrane 102 and one or more bipolar membrane 104. In some embodiments, electrolyte stream 120 passes through a region, or channel, between electrode 110 and the adjacent membrane. For example, as shown in FIG. 1, electrolyte stream 110 passes the channel located between each electrode 110 and its adjacent membrane, anion exchange membrane 102.

Figure 2:
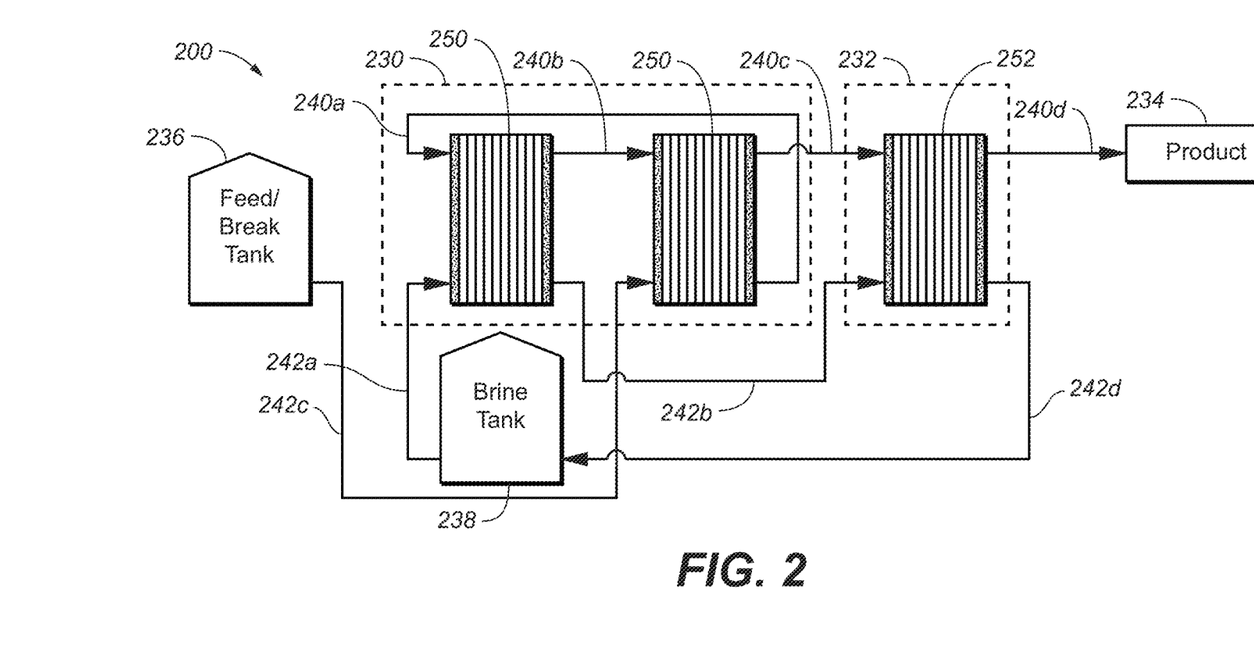
FIG. 2 shows a process flow diagram of an electrodialysis system for removing both ions and dissolved silica from a water stream, according to some embodiments.

FIG. 2 provides a simplified process flow diagram of an electrodialysis system 200 according to some embodiments. In some embodiments, electrodialysis system 200 may include a multi-pass electrodialysis system (i.e., stage one 230) placed in combination with a bipolar membrane electrodialysis system (i.e., stage two 232). Stage one 230 can be a desalination stage that removes dissolved ions from water (e.g., traditional electrodialysis). Stage two 232 can be a de-silicanization stage that removes silica from water. For example, stage two 232 may include one or more bipolar membrane electrodialysis devices 252 such as the one described with respect to bipolar membrane electrodialysis device 100 of FIG. 1, above. Electrodialysis system 200 may also include feed tank 236, product stream 240d, product 234, and brine tank 238.

Stage one 230 of electrodialysis system 200 may include one or more electrodialysis devices 250. An individual electrodialysis device 250 (i.e., an ion-exchange device) can include at least one pair of electrodes and at least one pair of ion-exchange membranes placed there between. The at least one pair of ion-exchange membranes can include a cation-exchange membrane ("CEM") and an anion-exchange membrane ("AEM"). In addition, at least one of the ion-exchange membranes (i.e., CEMs and/or AEMs) has a spacer on the surface of the ion-exchange membrane facing the other ion-exchange membrane in an electrodialysis device. In some embodiments, both the CEMs and the AEMs have a spacer on at least one surface facing the other ion-exchange membrane. The spacer can include a spacer border and a spacer mesh.

Electrodialysis system 200 includes several brine streams and product streams. In some embodiments, stream 242c flows from feed tank 236 to one of the one or more electrodialysis devices 250 as a brine inlet stream. In some embodiments, stream 242c may bypass an upstream electrodialysis device 250 and enter a downstream electrodialysis device 250 as a brine inlet stream. In some embodiments, stream 242c passes through the downstream electrodialysis device 250 and exits as a brine outlet stream (i.e., stream 240a). This brine outlet stream may then be routed to an upstream electrodialysis device 250 (e.g., the first electrodialysis device 250) as a product inlet stream for upstream electrodialysis device 250.

In some embodiments, product stream 240b is the product outlet stream of an upstream electrodialysis device 250 and a product inlet of a downstream electrodialysis device 250. Product stream 240c may be the product outlet of a downstream electrodialysis device 250 and a product inlet for stage two 232, or a bipolar membrane electrodialysis device 252 of stage two 232. In some embodiments, product stream 240c may be the product outlet of a last electrodialysis device 250 of stage one 230.

In some embodiments, brine stream 242a may be the brine inlet stream for an upstream electrodialysis device 250. In some embodiments, brine stream 242b may be the brine outlet stream of the upstream electrodialysis device 250 and/or the brine outlet stream for the first stage 230 of electrodialysis system 200. Brine stream 242b may bypass one or more electrodialysis devices 250. In some embodiments, the brine outlet stream of bipolar membrane electrodialysis device 252 of stage two 232 may be routed to brine tank 238. Brine tank 238 serves as the holding reservoir for a brine recirculation loop. Brine stream 242 flows from brine tank 238 to a first electrodialysis device 250.

In stage one 230, the brine stream(s) accepts ions from the treated water or product stream(s). Thus, the ionic concentration of a brine stream increases as it passes through an electrodialysis device 250. In stage two 232, the brine stream(s) serves as a sink for both acidic hydronium ions resulting from the water splitting process and anions that are transferred across the anion exchange membranes, as described above with respect to FIG. 1. This acidified brine stream is then routed back to the brine tank to complete the recirculation loop, as explained above.

Once the treated water has passed through each of the electrodialysis devices 250 of stage one 230 to produce desalinated water, the desalinated water is then passed to the alkaline/base chamber of bipolar membrane electrodialysis device 252 of stage two 232.

As described above with respect to bipolar membrane electrodialysis device 100, a water splitting reaction occurs in bipolar membrane electrodialysis device 252 of stage two 232 of electrodialysis system 200. Hydroxide ions produced via the water splitting reaction serve to increase the pH of the product stream and to ionize dissolved silica in the product stream. Anions are also transferred out of this product stream and into the brine stream via the adjoining anion exchange membrane of bipolar membrane electrodialysis device 252.

As described in detail in U.S. Provisional Application No. 62/831,508 titled "Electrodialysis Systems with Decreased Concentration Gradients at High Recovery Rates," the configuration depicted in FIG. 2 achieves a lower concentration gradient in the second electrodialysis device 250 for increased recovery rates. Further, the configuration of FIG. 2 provides a desalinated water stream to bipolar membrane electrodialysis device 252 of stage two 232, removes silica by first ionizing it and then transferring it across anion exchange membranes in bipolar membrane electrodialysis device 252; and acidifies the brine stream without the need for chemical addition.

Figure 3:
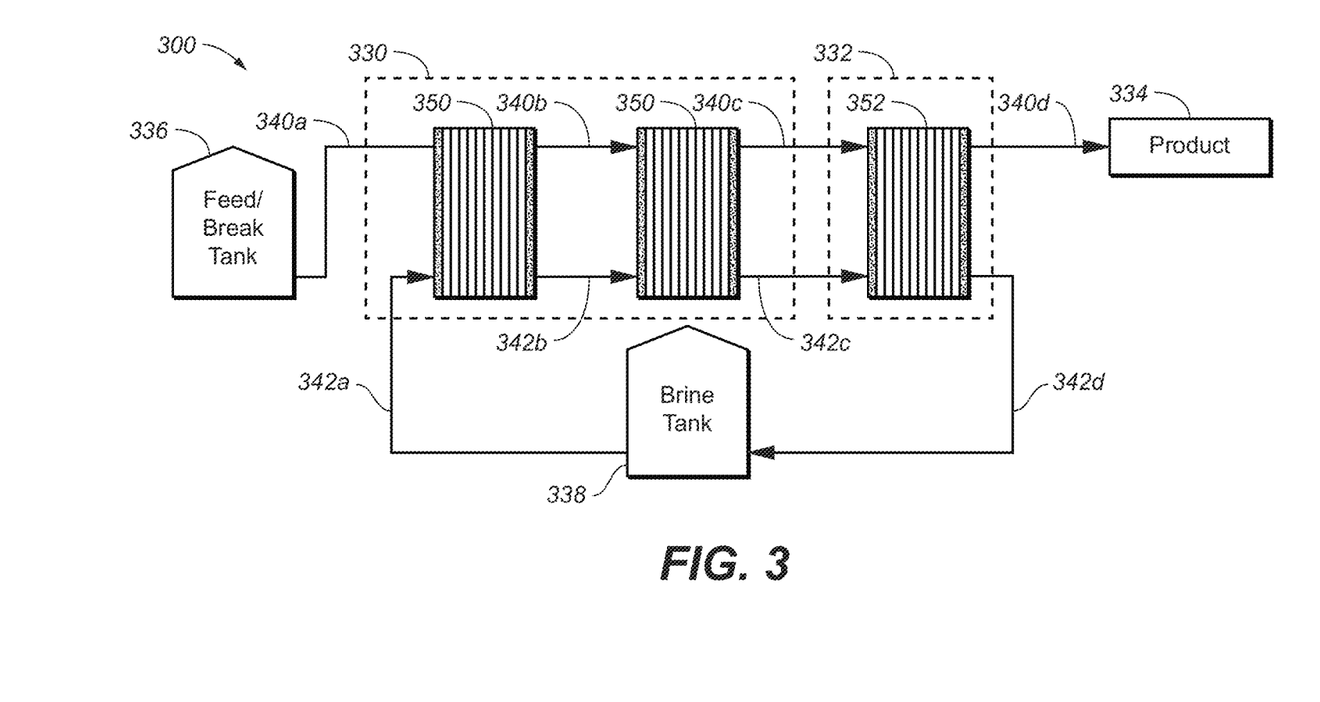
FIG. 3 shows a process flow diagram of an electrodialysis system for removing both ions and dissolved silica from a water stream, according to some embodiments.

FIG. 3 provides a simplified process flow diagram of an electrodialysis system 300 according to some embodiments. In particular, the configuration depicted in FIG. 3 is a conventional "straight-through" flow configuration. In this arrangement, the product streams (i.e., water to be treated) and the brine streams are each passed sequentially through the treatment train.

In some embodiments, electrodialysis system 300 can include a conventional straight-through electrodialysis system (i.e., stage one 330) combined with a bipolar membrane electrodialysis system (i.e., stage two 332). Stage one 330 can be a desalination stage that removes dissolved ions from water (e.g., traditional electrodialysis). Stage one 330 of electrodialysis system 300 may include one or more electrodialysis devices 350. An individual electrodialysis device 350 may include any or all of the features described above with respect to electrodialysis device 250 of FIG. 2. Stage two 332 can be a de-silicanization stage that removes silica from water. For example, stage two 332 may include one or more bipolar membrane electrodialysis devices 352 such as the bipolar membrane electrodialysis device 100 described with respect to FIG. 1, above. Electrodialysis system 300 may also include feed tank 336, product 334, and brine tank 338.

In some embodiments, stage one 330 may include two electrodialysis devices 350 as shown in FIG. 3. However, any number between one and ten electrodialysis devices 350 may be used. In some embodiments, the electrodialysis devices 350 may be arranged in series. In each electrodialysis device 350 of electrodialysis system 300, ions are transferred from the product stream(s) to the brine stream(s). The number of electrodialysis devices 350 is designed such that the desired water quality is produced at the end of the electrodialysis process.

Once the desired ion concentration is reached in stage one 330, the product water of product stream 340c is passed to the base chamber of bipolar membrane electrodialysis device 352 (e.g., base chamber 122 as described with respect to FIG. 1). As described above in detail with respect to bipolar membrane electrodialysis device 100 of FIG. 1, water of the product stream is split into hydrogen and hydroxide ions at the bipolar membrane (i.e., bipolar membrane 104 of FIG. 1). The hydroxide ions are directed into the chambers with the product water from stage one. The hydroxide ions increase the pH of the product stream, causing silica in the solution to ionize. This allows the ionized silica to transfer from the product stream into the brine stream.

In some embodiments, the brine water enters stage two 332 of the electrodialysis system 300 after passing from brine tank 338 to stage one 330 of electrodialysis system 300 and receiving ions from the product streams during stage one 330. After passing through the final electrodialysis device 350 of stage one 330, brine stream 342c is passed to the acid chamber of the two-chamber bipolar membrane electrodialysis device 352 (e.g., acid chamber 124 as described with respect to FIG. 1). Here, hydronium ions produced via water splitting reduce the pH of the brine stream. The brine stream also serves as a sink for the silica that is removed from the treated product stream. Once the brine stream exits the bipolar membrane electrodialysis device 352 (i.e., brine stream 342d), it is returned to brine tank 338 for recirculation through the system.

In some embodiments, electrodialysis system 300 includes product streams 340a, 340b, and 340c. Product stream 340a flows from feed tank 336 to a first electrodialysis device 350 as the product inlet stream. Product stream 340b is the product outlet stream of the first electrodialysis device and the product inlet stream for a second electrodialysis device 350. Product stream 340c is the product outlet stream of the second electrodialysis device 350 and the product inlet stream for a first bipolar membrane electrodialysis device 352 of stage two 332.

In some embodiments, electrodialysis system 300 includes brine streams 342a, 342b, 342c, and 342d. Brine stream 342a flows from brine tank 338 to the first electrodialysis device 350 as the brine inlet stream. Brine stream 342b is the brine outlet stream for the first electrodialysis device 350 and the brine inlet stream for the second electrodialysis device 350. Brine stream 342c is the brine outlet stream for the second electrodialysis device 350 and the brine inlet stream for the first bipolar membrane electrodialysis device 352. Brine stream 342d is the brine outlet stream of the last of the one or more bipolar membrane electrodialysis devices 352. Brine stream 342d flows to brine tank 338 to form a brine recirculation loop.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. An electrodialysis system comprising:
   one or more electrodialysis devices, the one or more electrodialysis devices comprising a product inlet stream, a product outlet stream, a brine inlet stream, and a brine outlet stream; and
   one or more bipolar membrane electrodialysis devices, the one or more bipolar membrane electrodialysis devices comprising a product inlet stream, a product outlet stream, a brine inlet stream, and a brine outlet stream,
   wherein the product inlet stream of a first bipolar membrane electrodialysis device of the one or more bipolar membrane electrodialysis devices comprises the product outlet stream of a first electrodialysis device of the one or more electrodialysis devices.

2. The electrodialysis system of claim 1, wherein each bipolar membrane electrodialysis device of the one or more bipolar membrane electrodialysis devices comprises one or more anion exchange membranes and one or more bipolar membranes.

3. The electrodialysis system of claim 2, wherein each bipolar membrane of the one or more bipolar membranes comprises an anionic material and a cationic material.

4. The electrodialysis system of claim 2, wherein the one or more anion exchange membranes and the one or more bipolar membranes form an alternating stack within each bipolar membrane electrodialysis device of the one or more bipolar membrane electrodialysis devices.

5. The electrodialysis system of claim 1, wherein the one or more electrodialysis devices are configured to remove dissolved ions from a feed stream to form a desalinated product stream.

6. The electrodialysis system of claim 1, wherein the one or more bipolar membrane electrodialysis devices are configured to remove silica from a desalinated product stream.

7. The electrodialysis system of claim 1, wherein the product inlet stream for a second electrodialysis device comprises a brine outlet stream of the first electrodialysis device of the one or more electrodialysis devices.

8. The electrodialysis system of claim 7, wherein the second electrodialysis device is located before the first electrodialysis device.

9. The electrodialysis system of claim 1, wherein the brine inlet stream for the first bipolar membrane electrodialysis device comprises the brine outlet stream of the second electrodialysis device.

10. The electrodialysis system of claim 1, comprising a feed stream, wherein the brine inlet stream of the first electrodialysis device comprises the feed stream.

11. The electrodialysis system of claim 1, comprising a feed stream, wherein the product inlet stream of a second electrodialysis device comprises the feed stream.

12. The electrodialysis system of claim 11, wherein the product inlet stream of the first electrodialysis device comprises the product outlet stream of the second electrodialysis device.

13. The electrodialysis system of claim 11, wherein the brine inlet stream of the first bipolar membrane electrodialysis device comprises the brine outlet stream of the first electrodialysis device.

14. The electrodialysis system of claim 1, wherein the product inlet stream of the first bipolar membrane electrodialysis device comprises the product outlet stream of the first electrodialysis device.

* * * * *